Patented Apr. 14, 1953

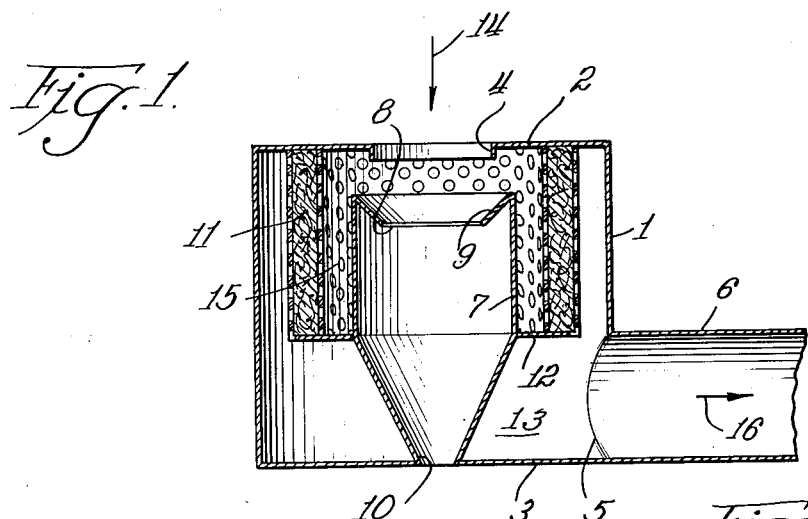
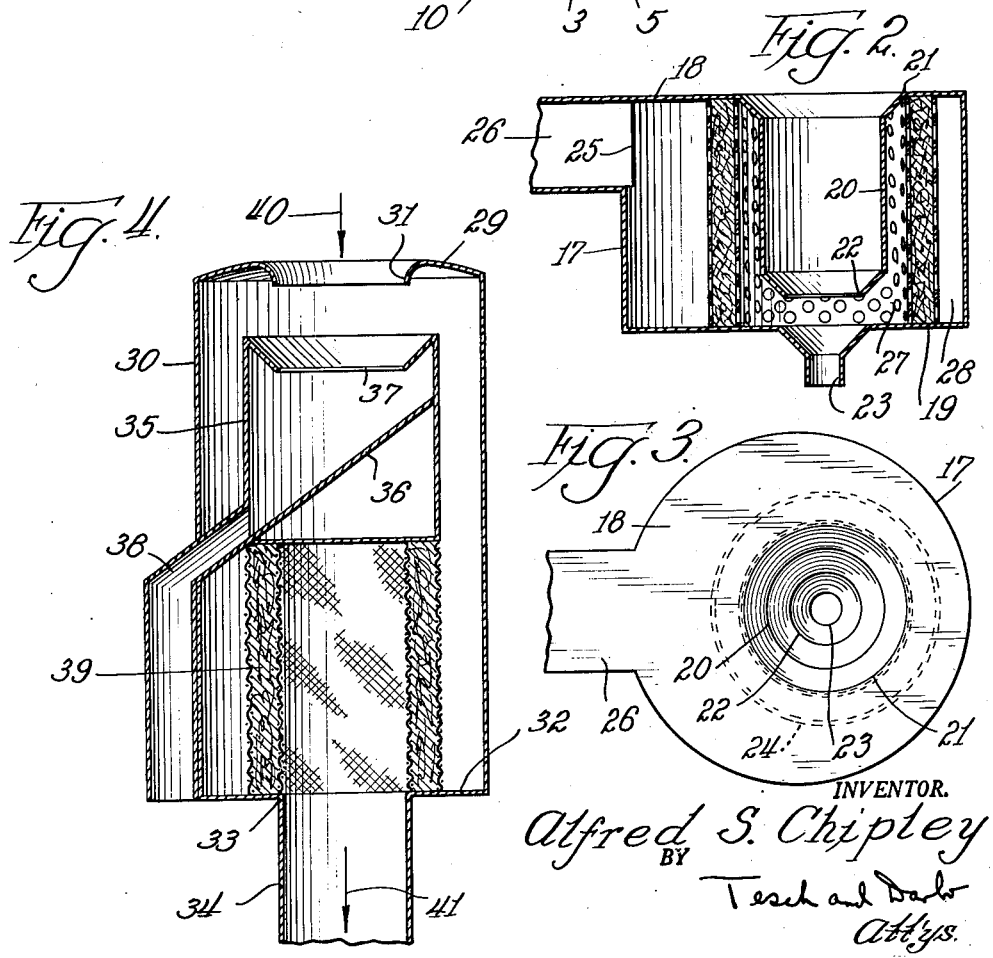

2,634,821

UNITED STATES PATENT OFFICE 2,634,821

COMBINED INERTIAL AIR CLEANER AND FILTER

Alfred S. Chipley, Mundelein, Ill., assignor to Burgess-Manning Company, Libertyville, Ill., a corporation of Illinois Application August 15, 1947, Serial No. 768,737

5 Claims. (Cl. 183—73)

This invention relates to devices for separating solid or liquid particles from gases in which such particles are entrained, and particularly to a combination air cleaner wherein the particles are removed from a stream of air or other gases in two stages, the first operating by reason of the inertia of particles and the second being a filtration process.

The object of the invention is to provide an efficient particle separator which requires a minimum of servicing to keep the device operating efficiently. A further object is to provide a combined unit in which the air is filtered only after it has undergone a pre-cleaning process wherein a substantial portion of the particles are removed from the gaseous vehicle by reason of their greater inertia.

Further objects and the many advantages of the invention will become apparent as the description proceeds.

In the accompanying drawing,

Fig. 1 is a cross-sectional view of one form of the invention;

Fig. 2 is a cross-sectional view of a modified form of the invention;

Fig. 3 is a top view of the device of Fig. 2; and

Fig. 4 is a cross-sectional view of a further modification of the invention.

A wide variety of relatively intricate forms of air cleaning equipment has heretofore been devised and used for the more or less complete removal of solid and liquid particles from air. Excepting apparatus which employs a liquid washing or scrubbing media, such equipment generally either utilizes the inertia of the particles entrained in a stream of air to effect separation or the air is caused to pass through a filtering material which catches and holds the particles. These filters require constant attention as they progressively fill with particles and thus gradually restrict the flow of air through them. They must be cleaned or changed frequently. The inertial type cleaners, on the other hand, do not require such servicing. Since they depend, however, upon the mass of each particle, they do not efficiently remove fluffy objects nor are they entirely satisfactory for the removal of particles whose surfaces are large as compared with their masses; e. g., leaves.

In the combination unit herein described, the filters, which would be entirely inadequate alone because of their small size and the necessarily high speed of flow through each unit of area thereof, readily retain any light materials which might still be entrained in the air stream as it enters the filter.

The air cleaner illustrated in Fig. 1 includes a shell 1 having a top wall 2 and bottom wall 3. The shell may be cylindrical or otherwise shaped to form the necessary enclosure. An air inlet opening 4, which may be a simple sharp-edged orifice, is provided in top wall 2 for the passage of dirt-laden air into the cleaner. This opening is centrally located in wall 2; that is, it is spaced from the side walls, in order to permit radial flow of the stream after passage through the opening. An air outlet opening 5 is provided in a side wall of shell 1 and a suitable conduit 6 connects with the space immediately enclosed by the shell for the purpose of collecting and transmitting the cleaned air to a suitable blower or other air moving apparatus, not shown.

A dust trap 7 is mounted in the middle portion of the shell enclosure. This trap is a receptacle having a mouth 8 in alignment with air inlet opening 4; that is, in line with the stream of gases entering the cleaner through inlet opening 4. Although the entire top of dust trap 7 may be open, operation of the cleaner has been found to be somewhat improved by limiting the area of mouth 8 to a central area less than the cross section of the trap and providing a funnel-like section 9 to guide particles into the trap and avoid air turbulence within the trap. Air inlet opening 4 is preferably, though not necessarily, circular, and the shape of mouth 8 preferably corresponds with that of opening 4. The bottom of trap 7 converges to an outlet 10 which is either left open to the atmosphere for continuous discharge of the particles as they are removed from the air stream or which may be closed and provision made for the occasional withdrawal of accumulated material.

A suitable air filter 11 is interposed in the path of the air stream from inlet opening 4 to outlet opening 5. In the structure illustrated in Fig. 1, this filter, which may be of any suitable material, is in the form of a cylinder extending between top wall 2 of the cleaner shell and a plate or baffle 12 which encircles dust trap 7 and prevents the by-passing of air around the filter. The filter is spaced from both dust trap 7 and the side walls of shell 1 to permit the flow of air through all parts of the filter. Suitable means, not shown in the drawing, should be provided for the periodic withdrawal of filter 11 for cleaning or replacement.

The air cleaner of Fig. 1 is placed in operation by applying suction to chamber 13 by means of a suitable blower or other air moving apparatus connected with this chamber by conduit 6. The reduced pressure within shell 1 causes air to flow into the device through air inlet opening 4, as indicated by arrow 14. Upon passing through opening 4, this stream abruptly spreads to a lateral radial flow through the gap between top wall 2 at opening 4 and the top of dust trap 7 into space 15. Because the solid or liquid particles entrained in the entering air stream possess greater inertia, by reason of their greater density, than the gases, these particles project through mouth 8 of dust trap 7 and are thus removed from the air stream. The partially cleaned air then flows through filter 11 which operates to remove substantially all remaining particles and thence into chamber 13 and conduit 6, as indicated by arrow 16.

Means for preventing the flow of air into the shell enclosure through the dust trap must be provided. Outlet 10 may be closed or it may be open to the atmosphere. In either event, the effectiveness of inlet opening 4 in permitting the flow of air therethrough must be greater than that of dust trap mouth 8 in order to avoid the inflow of air through the trap mouth and avoid turbulence within the trap itself. The desired differential of air transmission efficiencies of the two openings may be brought about by forming inlet opening 4 larger than dust trap mouth 8 or by other available known means.

In the modified form of the air cleaner illustrated in Figs. 2 and 3, an enclosure is provided by a shell including a cylindrical side wall 17, a top wall 18 and a bottom wall 19. A conduit section 20 extends into the shell enclosure from an opening 21 in the top wall 18. This conduit section extends to a point short of bottom wall 19 of the shell. Its inner end is open to provide inlet opening 22 and the end portions of conduit section 20 are preferably funnelled, as shown, to facilitate the passage of air without undue resistance to inlet opening 22.

A dust trap 23 is provided in bottom wall 19 of the shell in alignment with inlet opening 22. The upper portion of the trap structure is funnelled to guide particles into the outlet opening at the bottom of the trap. The dust outlet may be open to the atmosphere or a suitable receptacle may be provided to receive dirt particles as they are separated from the air stream.

An air filter 24 extends between top wall 18 and bottom wall 19 of the shell. This filter is preferably in cylindrical form and completely surrounds conduit section 20 and air inlet opening 22 with the result that the air stream entering the cleaner through inlet opening 22 must pass through the filter before passing from the enclosure through outlet opening 25 and conduit 26.

Operation of the air cleaner thus described, is similar to that of Fig. 1. Air drawn into the apparatus through conduit section 20 and air inlet opening 22 spreads abruptly and flows into chamber 27. Particles entrain in this air stream project into dust trap 23 and pass from the apparatus through the dust outlet opening. The partially cleaned air then passes through filter 24 into chamber 28 and thence to outlet conduit 26. Conduit section 20 and filter 24, being preferably concentric, are eccentrically arranged with respect to the axis of cylindrical side wall 17 of the shell in order to permit the substantially uniform passage of air through all parts of filter 24.

The device of Fig. 4 differs from that of Fig. 1 principally in the arrangement of the elements. The top 29 of shell 30 is centrally apertured to provide an air inlet opening 31. Bottom wall 32 is similarly apertured at 33 for the passage of cleaned air into outlet duct 34. A dust trap 35 with an inclined false bottom 36 is mounted within shell 30 in spaced relation to the side wall thereof. Mouth 37 of dust trap 35 is in alignment with inlet opening 31 and a spout 38 connects with the bottom of trap 35 to carry away accumulated particles. A cylindrical filter element 39 extends between the dust trap structure and bottom wall 32 of the shell.

Particle-laden air drawn into the cleaner at inlet opening 31, as indicated by arrow 40, is relieved of a substantial part of its burden of particles as the latter project into dust trap 35 as the stream spreads and flows radially over the top of the trap to the annular passageway between the side wall of shell 30 and the dust trap. Cleaning of the air is completed as it flows through filter 39 and the cleaned air passes from the apparatus through outlet duct 34, as indicated by arrow 41.

A thorough understanding of the invention herein described will immediately suggest many possible modifications involving changes in the form or arrangement of the several elements of the units. Those shown and described are intended merely to exemplify the invention and show its mode of operation. The full scope of the invention is intended to be limited only by the appended claims.

Invention is claimed as follows:

1. Apparatus for removing entrained particles from a stream of air comprising a shell having side walls and end walls forming an enclosure, a wall of said shell having an air outlet opening therein and one of said end walls having an air inlet opening therein, means forming a dust trap having a mouth arranged in said shell in alignment with said inlet opening and spaced from said inlet opening to form a gap between said inlet opening and said mouth, means for preventing the flow of air into said enclosure through said dust trap, said side walls being spaced from said air inlet opening and said dust trap to provide a space laterally adjacent to said gap, and an air filter in said space and operatively disposed across the path of air through said enclosure, said filter being located laterally of said gap and between and in spaced relation to said gap and the side walls of said shell to provide a space on each of the opposite sides of said filter, said outlet opening being in communication with the space between said filter and said side walls.

2. Apparatus in accordance with claim 1 in which the filter extends across the enclosure from one end wall to the other end wall.

3. Apparatus in accordance with claim 1 in which the air filter extends into the enclosure from the end wall having the air inlet opening therein and completely surrounds the gap between the inlet opening and the mouth of the dust trap.

4. Apparatus in accordance with claim 3 in which the air filter is cylindrical and extends from the end wall having the air inlet opening to an extremity at a point short of the opposite end wall, and a baffle extends laterally outward from the dust trap to said extremity of said filter whereby to guide the stream of air to said filter.

5. Apparatus for removing entrained particles from a stream of air comprising a shell having side walls and end walls forming an enclosure, a wall of said shell having an air outlet opening therein and one of said end walls having an air inlet opening therein, a dust trap within said enclosure and spaced from said side walls, said trap having a mouth in alignment with and spaced from said inlet opening to form a gap between said inlet opening and said mouth, means for preventing the flow of air into said enclosure through said dust trap, said side walls being spaced from said air inlet opening and said dust trap to provide a space laterally adjacent to said gap, and an air filter in said space and operatively disposed across the path of air through said enclosure, said filter being located laterally of said gap and between and in spaced relation to said gap and the side walls of said shell to provide a space on each of the opposite sides of said filter, said outlet opening being in communication with the space between said filter and said side walls.

ALFRED S. CHIPLEY.

References Cited in the file of this patent

UNITED STATES PATENTS

| Number | Name | Date |
|---|---|---|
| 485,915 | Duckham | Nov. 8, 1892 |
| 1,405,399 | Donaldson | Feb. 7, 1922 |
| 1,774,301 | Terry | Aug. 26, 1930 |
| 2,289,474 | Anderson | July 14, 1942 |
| 2,319,894 | Vokes | May 25, 1943 |
| 2,407,194 | Vokes | Sept. 3, 1946 |
| 2,474,017 | Smith et al. | June 21, 1949 |

FOREIGN PATENTS

| Number | Country | Date |
|---|---|---|
| 335,117 | France | Nov. 13, 1903 |
| 380,916 | Germany | Sept. 13, 1923 |